United States Patent [19]
Nickles

[11] Patent Number: 5,884,681
[45] Date of Patent: Mar. 23, 1999

[54] METHOD AND APPARATUS FOR CONNECTING OR SECURING A POWER TOOL WITH RESPECT TO A WORK SURFACE

[76] Inventor: Steven R. Nickles, H-534 County Road 7, Deshler, Ohio 43516

[21] Appl. No.: 999,496

[22] Filed: Dec. 29, 1997

[51] Int. Cl.⁶ .............................. B27B 5/24; B25H 1/00; B27C 9/00; B27M 1/00
[52] U.S. Cl. .................. 144/329; 144/286.1; 144/286.5; 83/477.2; 83/574; 269/290; 248/670; 248/676
[58] Field of Search ................................ 269/289 R, 290, 269/296; 83/477.1, 477.2, 574; 144/1.1, 286.1, 286.5; 248/637, 670, 671, 672, 676

[56] References Cited

U.S. PATENT DOCUMENTS

| | | |
|---|---|---|
| 4,105,055 | 8/1978 | Brenta . |
| 4,111,409 | 9/1978 | Smith . |
| 4,133,360 | 1/1979 | Sanfilippo et al. . |
| 4,186,784 | 2/1980 | Stone .................................... 144/286.5 |
| 4,276,799 | 7/1981 | Muehling . |
| 4,320,678 | 3/1982 | Volk ........................................ 83/477.2 |
| 4,733,704 | 3/1988 | Wolff . |
| 5,115,847 | 5/1992 | Taber . |
| 5,135,036 | 8/1992 | Caron ................................... 144/286.5 |
| 5,139,061 | 8/1992 | Neilson . |
| 5,144,994 | 9/1992 | Stecker, Sr. .......................... 144/286.5 |
| 5,193,598 | 3/1993 | Estrem . |
| 5,205,198 | 4/1993 | Foray et al. . |
| 5,398,740 | 3/1995 | Miller . |
| 5,682,934 | 11/1997 | Rybski ..................................... 83/574 |

OTHER PUBLICATIONS

Craftsman Power and Hand Tools; Sears Shop at Home catalog; 1997–98; cover page, and pp. 121 and 127.

*Primary Examiner*—W. Donald Bray
*Attorney, Agent, or Firm*—Marshall & Melhorn

[57] ABSTRACT

There is disclosed a method and apparatus for mounting, securing or connecting a power tool with respect to a work surface. Apparatus is disclosed in the form of a frame member with cross-rails which may be mounted to a work surface such as a table top or portable work bench. Means to mount a power tool to the apparatus are disclosed, as are means to mount a cross bar to the cross-rails.

19 Claims, 3 Drawing Sheets

METHOD AND APPARATUS FOR CONNECTING OR SECURING A POWER TOOL WITH RESPECT TO A WORK SURFACE

FIELD OF INVENTION

The present invention relates to a means for connecting or securing a power tool with respect to a surface. More particularly, the present invention relates to an apparatus for connecting or securing a power tool with respect to a work surface. Most particularly, the present invention relates to an apparatus for temporarily, but securely, connecting or securing power tools on a work surface. Said support may be mounted to a work bench if desired.

DESCRIPTION OF THE PRIOR ART

The use of means to locate a power tool with respect to a work surface is known in the art. However, such locating means, until the time of the present invention, have provided a means of guiding the movement of the tool with respect to a work surface, and not to connecting or securing of a power tool with respect to a work surface.

The U.S. Pat. No. 4,133,360, issued Jan. 9, 1979 to Sanfilippo et al., shows a portable circular power hand saw bench arranged to allow the full performance of a power hand saw in cross cut and ripping operations, the bench being provided with a work support surface, a frame with adjustable guides for the power saw which suspends the power saw over the work pieces, and means to permit the bench to be folded into a compact form for shipping or storage when not in use, or to be unfolded and extended to handle work pieces of some finite length or width.

The U.S. Pat. No. 4,105,055, issued Aug. 8, 1978 to Robert Brenta, discloses a portable kit which can be quickly and easily converted so as to operate either as a circular saw, a table saw, or a jig saw or wood shaper. The kit includes a portable case for being carried in the hand, and contains a collapsible table, a wood and metal table top for placement on the table, a set of power tools comprising a circular saw, a jig saw, and a router for selectively being mounted to one of the table tops so to perform more precise machining of wood then is possible with a hand held tool.

The U.S. Pat. No. 5,193,598, issued to Jim J. Estrem on Mar. 16, 1993, discloses a portable support stand having a platform supporting the power tool or work piece, and brackets for releaseably attaching the power tool to the platform. Right and left support arms are attached to the support stand for supporting the ends of the work piece, and an attachment mechanism connects the platform to a saw horse so that the support arms are generally parallel to the longitudinal axis of the saw horse.

It can be understood by those skilled in the art that the patents to Sanfilippo et al. and Brenta show guide means for moving a power tool with respect to a work surface. The patent to Brenta shows a platform for supporting a power tool or work piece, and brackets for releaseably attaching the power tool to the platform. It is not universal in nature, as each type of power tool would require a separate platform.

Such prior art devices were unnecessarily expensive and limited in use, thus those skilled in the art continued to search for a solution to the problem of how to secure or connect a wide range of power tools in a universal manner with respect to a work surface.

SUMMARY OF THE INVENTION

The present invention relates to a method and apparatus for mounting, connecting, or securing a power tool with respect to a work surface, such as the top of a work bench. The power tool may be fixedly secured at virtually any location on the surface of the apparatus. Accordingly it is an object of the present invention to provide a means for mounting, connecting or securing a power tool with respect to a work surface.

A further object of the present invention is to provide said means for mounting, connecting a or securing in the form of a frame. The frame can be mounted to a work surface, such as found on a work bench.

A further object of the present invention is to provide a work bench wherein said frame is an integral part of said work bench.

A still further object of the invention is to provide a frame means of the foregoing nature having a rectangular frame with a pair of adjustable cross rails moveable toward and away from each other, said adjustable cross rails having slots therein to which a power tool may be secured.

It is still another object of the present invention to provide a method for mounting, connecting, or securing a power tool with respect to a work surface. The method includes providing a work surface including a means for mounting, connecting, or securing said tool with respect to the work surface. Next, manipulating said means, such that a tool may be mounted at any point along said work surface. Lastly, mounting connecting or securing said tool with respect to said work surface.

Still another object of the invention is to provide quick mount cups for connecting or securing a power tool to the work surface. The purpose of the cups are that a tool may be easily removed from the work surface when desired.

Further objects of the invention will appear as the description proceeds. To accomplish the above and related objects, this invention may be embodied in the form illustrated in the accompanying drawings, attention being called to the fact, however, that the drawings are illustrative only, and that changes may be made in the specific construction illustrated and described and be well within the scope of the claims.

DESCRIPTION OF THE PREFERRED EMBODIMENT

Figure 1:
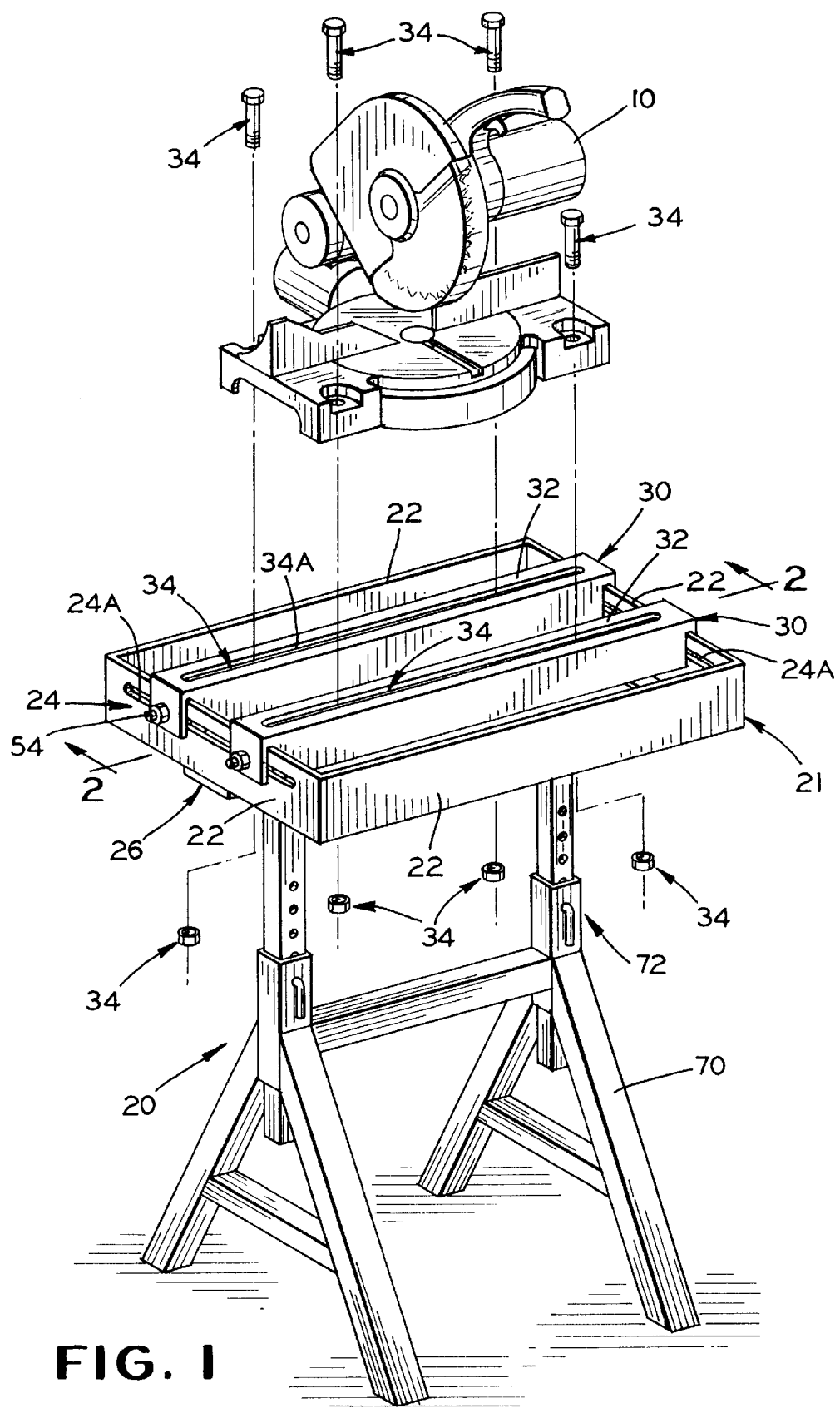
FIG. 1 is a perspective view of a construction embodying the present invention.
Figure 2:
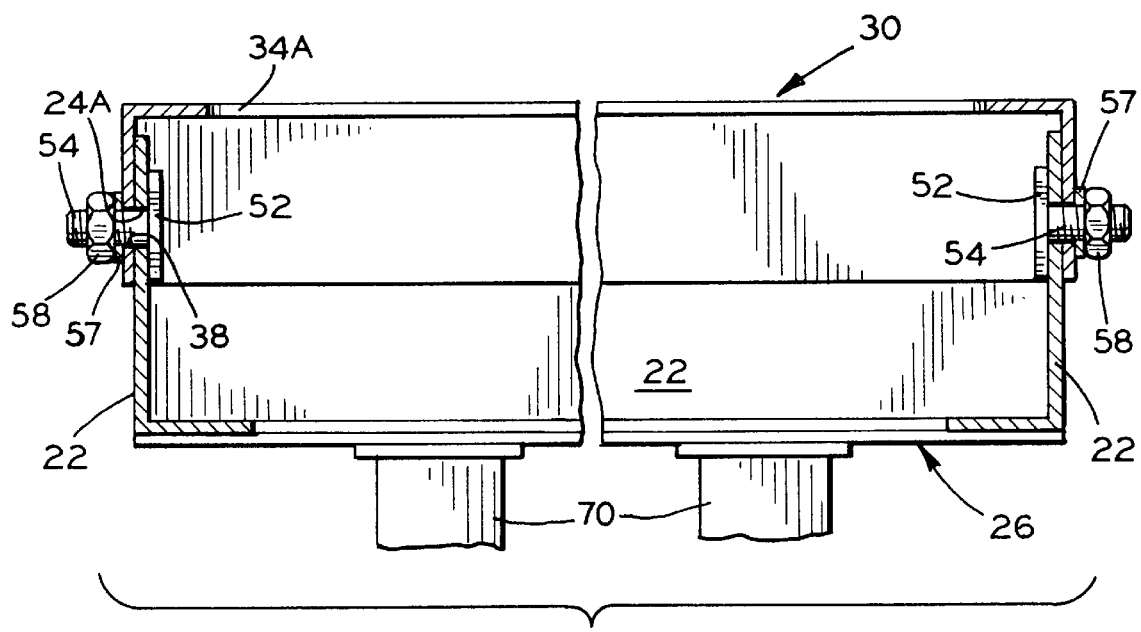
FIG. 2 is a vertical, sectional, view of the construction shown in FIG. 1.

In FIG. 1, a power tool, such as, a circular saw 10, is shown above a work bench 20. The work bench 20 has a frame 21 comprised of four frame members 22, which may be attached to each other at the right angles in the shape of a rectangle. Two of the frame members 22 have a means 24 to mount a cross rail 30 at any point along the frame member. The two frame members 22 are shown in a 180° opposed relationship. Two shoulder means 26 are also attached to the frame 21 as shown in FIG. 2. The shoulder means 26 are attached to two opposing frame members 22.

Figure 3:
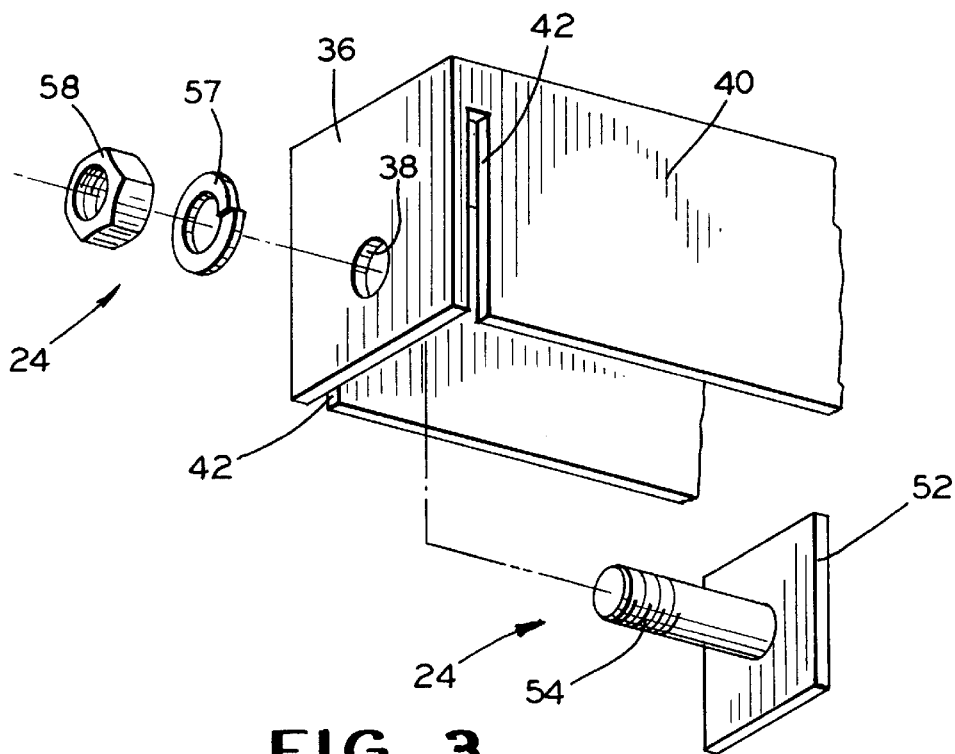
FIG. 3 is a partial perspective view of the means for securing a cross rail to a particular location along the frame.
Figure 4:
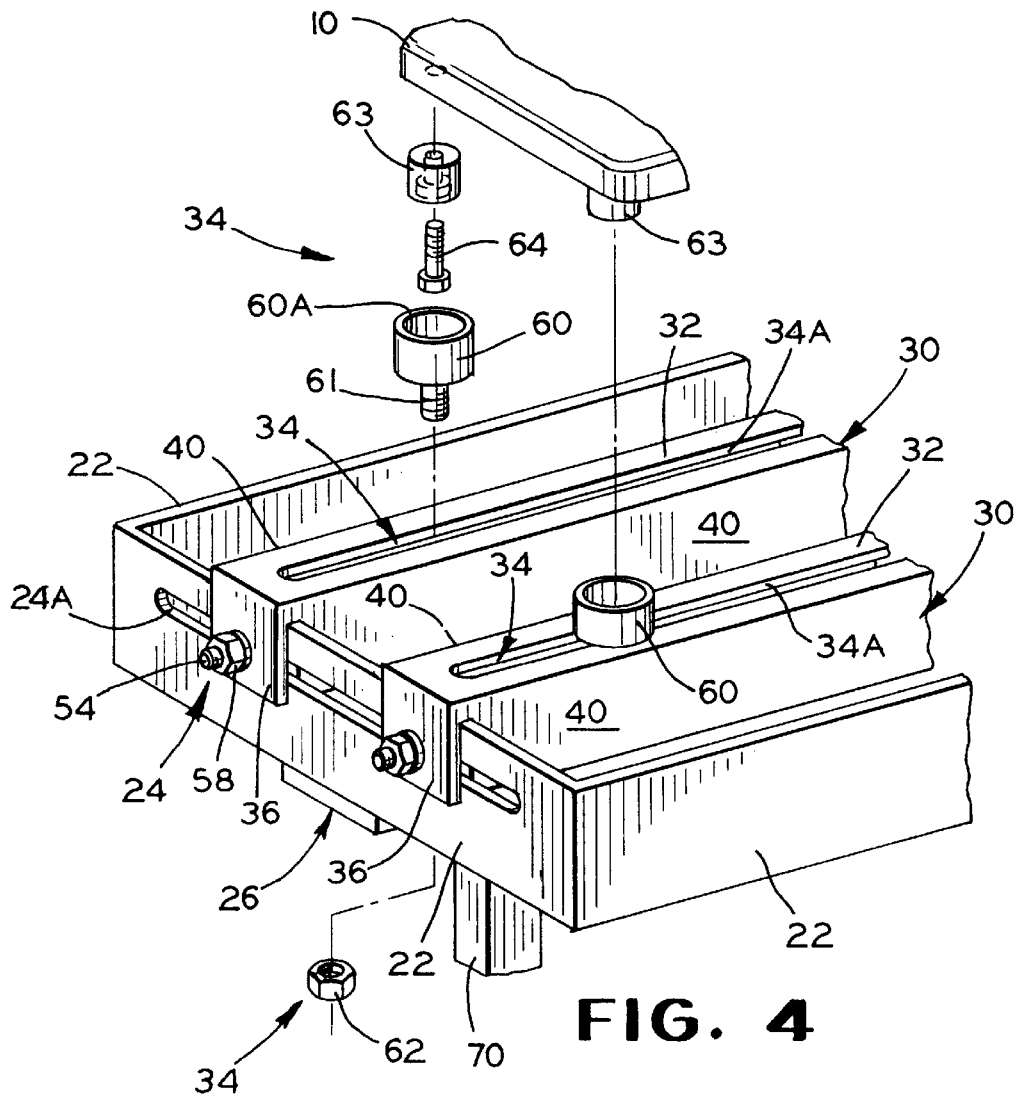
FIG. 4 is a partial, exploded, view of the construction shown in FIG. 1, and including a means to mount a power tool to the construction shown.

A plurality of cross rails 30 are mounted to the opposing frame members 22 with the means 24 to mount a cross rail 30. Each cross rail 30 has a top surface 32 with means 34 for mounting a power tool 10. Each cross rail 30 also has two downwardly depending end surfaces 36 (FIG. 3). Each end surface 36 has an aperture 38. The aperture 38 is in horizontal alignment with the means for mounting a cross rail 24. Each cross rail 30 has two downwardly depending side surfaces 40. Each side surface has a slot 42 designed for engaging a frame member 22. Each slot 42 is immediately adjacent to an end surface 36. The work bench is also provided with a pair of vertical legs 70. The vertical legs 70 are attached to the shoulder means 26. They may be adjustable, as shown at 72.

Referring to FIGS. 1–3, the means 24 for securing a cross rail 30 to a frame member 22 further includes slot 24A, plate 52, and a threaded arm 54 extending from plate 52. To secure cross rail 30 to a frame member 22, the threaded arm 54 is passed through the horizontally aligned aperture 38 of an end surface 36, lock washer 57 is placed over threaded arm 54, and nut 58 is tightened. A similar process is followed to secure the other end of cross rail 30. To loosen and move cross rail 30, the process is reversed.

Figure 5:
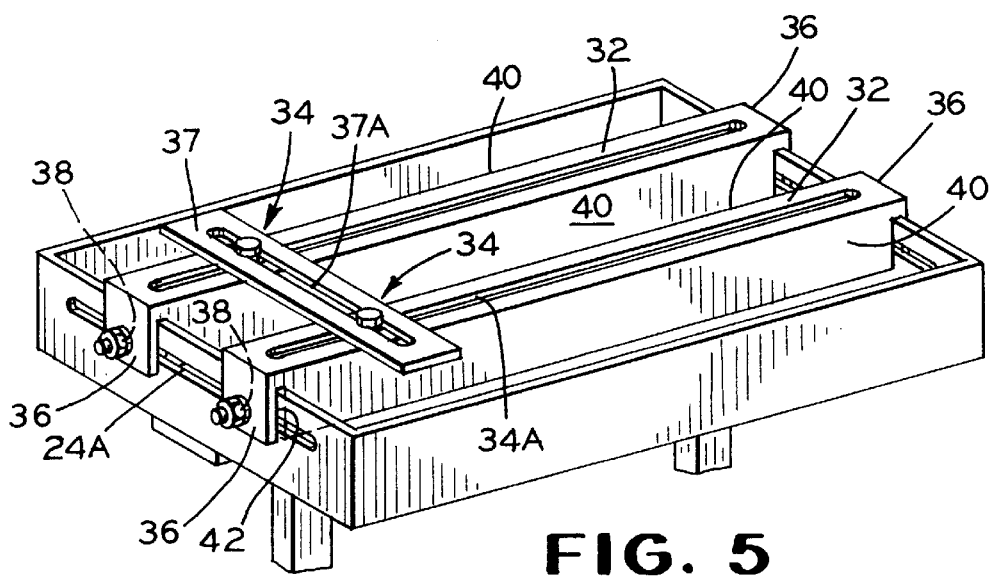
FIG. 5 is a modification of the construction shown in FIG. 4.

In instances where a cross bar 37 (FIG. 5) is required to aid in mounting a power tool to the cross rails 30, such cross bar 37 may be provided with slot 37a and may be mounted to the cross rails 30 with means 34 such as a bolt and passed through slot 34A.

In a modification of the present invention, the means 34 for mounting a power tool 10 to the work bench 20 may include quick mount cups 60. Each quick mount cup 60 has a cavity 60A therein to accept a bushing 63, and may have a threaded portion 61 insertable in slot 34 in the top surface 32 of the cross rail 30. A nut 62 secures each quick mount cup 60 to the cross rail 30.

Insertable into each quick mount cup 60 is a complementary shaped bushing 63 which has been secured to the base of the power tool 10 by a bolt 64. Thus, in this modification of the invention, the means 34 for mounting a power tool 10 to the cross rail 30 will consist of an assembly including the bushing 63 the bolt 64 the quick mount cup 60 having threaded portion 61, and the nut 62. It can be understood that, depending upon the nature of the power tool to be connected, mounted or secured to the cross rail 30, one or more of such assemblies may be required.

The forgoing disclosure has broadly disclosed means for connecting, securing, or mounting a power tool to a work surface, as well as a method for connecting, securing, or mounting a power tool to a work bench. In various modifications of the invention, the means is shown in the form of a frame member, and in the form of a frame member forming an integral part of a work bench. Those skilled in the art will understand that many other modifications of the present invention are well with in the scope of the present invention. Therefore, by considering carefully what is involved in connecting or mounting or securing a power tool to with respect to a work surface, a novel and unique method and apparatus have been provided.

I claim:

1. A method for securing a power tool in a fixed relationship with respect to a work surface, said method comprising the steps of:
   a) providing a work surface;
   b) providing said work surface with a means to mount a power tool at any predetermined, fixed location with respect to said work surface;
   c) manipulating said means to mount a power tool at any predetermined, fixed location with respect to said work surface until said means to mount is in one of said any predetermined, fixed locations with respect to said work surface; and
   d) mounting a power tool to said means to mount a power tool at any predetermined, fixed location with respect to said work surface, thereby positioning said power tool at said one of said any predetermined, fixed locations with respect to said work surface.

2. A support for securing power tools in an adjustable, but fixed location with respect to a work surface, said support comprising:
   a) a frame having four frame members, each one of said four frame members being attached to another one of said four frame members to form a parallelogram,
      i) two of said frame members having a means to adjustably mount a cross rail at any point along said frame members, said two frame members being in a 180 degrees opposed relationship,
      ii) said frame further comprising a means to attach to said work surface; and
   b) a plurality of cross rails mounted to said two of said frame members, each of said plurality of cross rails comprising:
      i) a top surface,
      ii) two downwardly depending end surfaces, and
      iii) two downwardly depending side surfaces, each of said two downwardly depending side surfaces having a slot provided therein immediately adjacent each of said two downwardly depending end surfaces, each of said slots engaging one of said two frame members.

3. The support defined in claim 2, wherein each top surface of said plurality of cross rails includes a means for mounting a power tool.

4. The support defined in claim 3, and further comprising a means for mounting said support to a table top.

5. A work bench having means to secure power tools in an infinite variety of fixed locations with respect to a surface thereof, said work bench comprising:
   a) a frame having four frame members, each one of said four frame members being attached to another one of said four frame members to form a parallelogram, said parallelogram defining a surface,
      i) two of said frame members including a means to adjustably mount a cross rail at any point along said frame members, said two frame members being in an opposed, facing relationship,
      ii) said frame further including a pair of shoulder means for receiving vertical legs;
   b) a pair of vertical legs mounted to said shoulder means; and
   c) a plurality of cross rails mounted to said two of said frame members including said means to adjustably mount a cross rail, each of said plurality of cross rails comprising:
      i) a top surface,
      ii) two downwardly depending end surfaces, and
      iii) two downwardly depending side surfaces, each of said two downwardly depending side surfaces having a slot provided therein immediately adjacent each of said two downwardly depending end surfaces, each of said slots engaging one of said two frame members, said two of said frame members and said plurality of said cross rails comprising said means to secure with respect to said surface of said work bench.

6. The work bench defined in claim 5, wherein each top surface of said plurality of cross rails include a means for mounting a power tool thereto.

7. The work bench defined in claim 6, wherein each of said downwardly depending end surfaces includes an aperture to accept a means for securing each of said plurality of cross rails to one of said two frame members.

8. The work bench defined in claim 7, and further including a means for securing each of said plurality of cross rails to one of said two frame members each of said means for securing utilizing one of said apertures in said end surface.

9. The work bench defined in claim 8, wherein said shoulders are disposed on said two opposing frame members and said vertical legs are attached to said shoulders.

10. The work bench defined in claim 9, wherein said vertical legs are adjustable.

11. The work bench defined in claim 10, wherein said means for securing each of said plurality of cross rails to one of said two frame members further include a plate having an arm extending from said plate, said arm having a threaded end.

12. The work bench defined in claim 6, further including a cross member, said cross member secured to said top surface of each of said plurality of cross rails.

13. The work bench defined in claim 12, wherein said cross member may be disposed at any point along said top surface of each of said plurality of cross rails.

14. The work bench defined in claim 6, wherein said means for mounting a power tool to said top surface of each of said plurality of cross rails further including a plurality of quick mount cups.

15. The work bench defined in claim 14, wherein said quick mount cups include a cavity and a means for attaching said quick mount cup to said top surface of said plurality of cross rails.

16. The work bench defined in claim 15, wherein said cavity is designed to receive a coupling, said coupling being attachable to a power tool.

17. The work bench defined in claim 16, wherein said coupling is made of rubber.

18. The work bench defined in claim 6, wherein said plurality of cross rails are a predetermined size to mount a plurality of power tools.

19. The work bench defined in claim 6, wherein said means for mounting a power tool to said top surface of said plurality of cross rails comprising a slot.

\* \* \* \* \*